US012357856B2

(12) United States Patent
Takahashi et al.

(10) Patent No.: US 12,357,856 B2
(45) Date of Patent: Jul. 15, 2025

(54) TREATMENT PLANT AND METHOD FOR DESIGNING TREATMENT PLANT

(71) Applicant: JGC CORPORATION, Kanagawa (JP)

(72) Inventors: Hiroki Takahashi, Kanagawa (JP); Tomonori Miyashita, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 681 days.

(21) Appl. No.: 17/642,701

(22) PCT Filed: Dec. 27, 2019

(86) PCT No.: PCT/JP2019/051632

§ 371 (c)(1),
(2) Date: Mar. 14, 2022

(87) PCT Pub. No.: WO2021/131077

PCT Pub. Date: Jul. 1, 2021

(65) Prior Publication Data

US 2022/0323802 A1 Oct. 13, 2022

(51) Int. Cl.
*A62C 3/00* (2006.01)
*A62C 3/02* (2006.01)
*A62C 3/06* (2006.01)

(52) U.S. Cl.
CPC ............ *A62C 3/002* (2013.01); *A62C 3/0278* (2013.01); *A62C 3/06* (2013.01)

(58) Field of Classification Search
CPC ......... A62C 3/002; A62C 3/0278; A62C 3/06; A62C 3/065
See application file for complete search history.

(56) References Cited

U.S. PATENT DOCUMENTS 11,191,986 B2 * 12/2021 Hart ........................ A62C 31/03
2003/0124496 A1 * 7/2003 Hough ............... A62C 99/0081 434/226

(Continued)

FOREIGN PATENT DOCUMENTS

JP H08107941 4/1996
JP 2003290377 10/2003

(Continued)

OTHER PUBLICATIONS

"International Search Report (Form PCT/ISA/210) of PCT/JP2019/051632", mailed on Mar. 24, 2020, with English translation thereof, pp. 1-5.

(Continued)

*Primary Examiner* — Joseph A Greenlund
(74) *Attorney, Agent, or Firm* — JCIPRNET

(57) ABSTRACT

Provided is a technology of preventing an increase in size of a treatment plant, which may be caused when a safety clearance for the prevention of spread of a fire is set, and restraining an increase in designed fire-extinguishing water usage. A treatment plant for handling a flammable liquid includes: an equipment placement region in which a plurality of equipments configured to handle the flammable fluid are placed, the equipment placement region being divided into four or more firewater supply sections. A plurality of fire-extinguishing water supply facilities are provided to the firewater supply sections, respectively, the fire-extinguishing water supply facilities each being capable of, when a fire occurs in the firewater supply sections, simultaneously supplying fire-extinguishing water to a fire-occurrence section and an adjacent section.

18 Claims, 9 Drawing Sheets

(56) References Cited

U.S. PATENT DOCUMENTS

| | | | | |
|---|---|---|---|---|
| 2008/0319716 | A1* | 12/2008 | Golinveaux | A62C 35/60 703/1 |
| 2010/0263885 | A1* | 10/2010 | Tuma | H05K 7/20781 169/46 |
| 2011/0259616 | A1* | 10/2011 | Stommel | A62C 37/40 169/61 |
| 2012/0118591 | A1* | 5/2012 | Yen | A62C 37/36 169/47 |
| 2012/0201603 | A1* | 8/2012 | Boulton | E03B 11/14 405/36 |
| 2015/0027739 | A1* | 1/2015 | Multer | A62C 35/68 169/37 |
| 2017/0252592 | A1* | 9/2017 | Pigeon | A47B 97/00 |
| 2019/0099630 | A1* | 4/2019 | Pigeon | A62C 31/02 |
| 2020/0041202 | A1* | 2/2020 | Arai | F25J 1/0022 |
| 2020/0054910 | A1* | 2/2020 | Workman | A62C 37/12 |
| 2020/0338375 | A1* | 10/2020 | Council | A62C 37/40 |
| 2021/0220681 | A1* | 7/2021 | Lovas | A62C 35/023 |
| 2022/0054876 | A1* | 2/2022 | Conboy | A62C 3/02 |
| 2022/0161081 | A1* | 5/2022 | Pigeon | A62C 37/11 |
| 2022/0323802 | A1* | 10/2022 | Takahashi | A62C 35/68 |

FOREIGN PATENT DOCUMENTS

| | | |
|---|---|---|
| JP | 2008005998 | 1/2008 |
| JP | 2011206395 | 10/2011 |
| JP | 2011206395 A * | 10/2011 |
| JP | 2015037457 | 2/2015 |
| JP | 2017133922 | 8/2017 |
| JP | 2019088423 | 6/2019 |

OTHER PUBLICATIONS

Office Action of Japan Counterpart Application, with English translation thereof, issued on May 23, 2023, pp. 1-9.

Office Action of Japan Counterpart Application, with English translation thereof, issued on Oct. 31, 2023, pp. 1-5.

* cited by examiner

TREATMENT PLANT AND METHOD FOR DESIGNING TREATMENT PLANT

CROSS-REFERENCE TO RELATED APPLICATION

This application is a 371 application of the International PCT application serial no. PCT/JP2019/051632, filed on Dec. 27, 2019. Each of the entirety of the above-mentioned patent applications is hereby incorporated by reference herein and made a part of this specification.

TECHNICAL FIELD

The present invention relates to a technology of arranging facilities that supply fire-extinguishing water in a treatment plant.

BACKGROUND ART

Examples of a treatment plant for processing fluid include a natural gas plant for liquefying natural gas and separating/recovering a natural gas liquid, a petroleum refining plant for distilling and desulfurizing crude oil or various intermediate products, and a chemical plant for producing a petrochemical product, an intermediate chemical product, and a polymer.

Each of these treatment plants is constructed on a predetermined outdoor site, and includes a large number of equipments and components. The large number of equipments and components include static equipments, such as a tower, a vessel, and a heat exchanger, dynamic equipments, such as a pump and a compressor, and pipes provided between the static equipments and the dynamic equipments.

Many of the large number of equipments and components placed on the site of the treatment plant handle a flammable fluid. Fire-extinguishing water supply facilities, such as a fire hydrant, a fire monitor, and a water spray facility are placed in the vicinity of the equipments and components described above.

Further, a safety clearance ranging from about several meters to about several tens of meters is set in some cases in view of prevention of the spread of a fire occurring in one of the equipments to the whole treatment plant. A region (equipment placement region) in which the equipments constituting the treatment plant are placed is divided into a plurality of sections. The safety clearance is set between the sections adjacent to each other.

Even when the equipment placement region is divided into the sections by the safety clearance, it is necessary to prevent the spread of the fire in each of the sections. Thus, fire-extinguishing water is supplied to each of the equipments that are placed in the equipment placement region (fire-occurrence section) including the equipment in which the fire has occurred, thereby achieving the prevention of an increase in temperature of a surface of each of the equipments.

In this case, when the number of safety clearances set on the site of the treatment plant is small, an area of each of the sections divided by the safety clearances becomes larger, resulting in high usage of the fire-extinguishing water, which is supplied to the fire-occurrence section when a fire occurs. As a result, a capacity of a water tank for fire-extinguishing water provided in the treatment plant or a water pumping capacity of a pump that delivers fire-extinguishing water from the water tank disadvantageously increases, causing an increase in construction cost of the treatment plant.

Meanwhile, an equipment that handles a flammable fluid cannot be provided in the safety clearance. Thus, in terms of successful placement of the equipments to constitute the treatment plant on a limited site, it is sometimes unrealistic to set a large number of safety clearances to reduce an area of each of the sections for the purpose of reducing the usage of fire-extinguishing water.

In Japanese Patent Application 1, there is described a technology of partitioning a closed space inside, for example, a building of a factory into a plurality of disaster prevention sections with use of fog curtains. Further, in Japanese Patent Application 2, there is described a technology of arranging safety cables for safety system facilities used in a nuclear power plant so that the safety cables are located separately in a plurality of fire sections.

In Japanese Patent Application 1 and Japanese Patent Application 2, however, there is found no description about a technology of arranging a large number of equipments that handle a flammable fluid on a limited site and, at the same time, restraining an increase in usage of fire-extinguishing water to be used when a fire occurs.

CITATION LIST

Patent Literature

Japanese Patent Application 1: laid-open H08-107941
Japanese Patent Application 2: laid-open 2017-133922

SUMMARY OF THE INVENTION

Problems to be Solved by the Invention

The present invention provides a technology of preventing an increase in size of a treatment plant, which may be caused when a safety clearance for the prevention of spread of a fire is set, and restraining an increase in designed fire-extinguishing water usage.

Means for Solving the Problem

According to at least one embodiment of the present invention, there is provided a treatment plant for handling a flammable liquid, the treatment plant including: an equipment placement region in which a plurality of equipments configured to handle the flammable fluid are placed, the equipment placement region being divided into four or more firewater supply sections so that the firewater supply sections include the equipments, respectively; and a plurality of fire-extinguishing water supply facilities provided to the firewater supply sections, respectively, the fire-extinguishing water supply facilities each being capable of, when a fire occurs in one of the equipments placed in the firewater supply sections, simultaneously supplying fire-extinguishing water to a fire-occurrence section corresponding to a firewater supply section in which the fire has occurred and an adjacent section being a firewater supply section adjacent to the fire-occurrence section.

The treatment plant may have the following features.

(a) The four or more firewater supply sections are defined so that a distance from the fire-occurrence section to a second firewater supply section next to the adjacent section always becomes equal to or larger than a preset safety clearance distance when any of the firewater supply sections becomes the fire-occurrence section. The safety clearance distance is set to fall within a range of from 3 meters to 50 meters. Further, when a pipe rack being a frame configured to hold a plurality of pipes through which a fluid to be sent and received between the plurality of equipments is placed in the equipment placement region, the safety clearance distance is regarded as being ensured between two firewater supply sections that are located facing each other across the pipe rack.

(b) A capacity to supply fire-extinguishing water to the plurality of fire-extinguishing water supply facilities is determined based on a maximum value of a result of calculation of a firewater supply amount to be supplied to the fire-occurrence section and the adjacent section, which is obtained for each of the firewater supply sections. A water drainage capacity of the treatment plant is determined based on the maximum value of the firewater supply amount. When an estimated water drainage amount in view of precipitation on a site of the treatment plant is larger than the maximum value of the firewater supply amount, the water drainage capacity of the treatment plant is determined based on the estimated water drainage amount.

(c) The fire-extinguishing water supply facilities are selected from a firewater supply facility group including a fire hydrant, a fire monitor, a water spray facility, and a foam fire-extinguishing facility.

(d) When an auxiliary facility selected from an auxiliary facility group including a plurality of firewater supply heads for a water spray facility configured to supply fire-extinguishing water, a plurality of foam heads for a foam fire-extinguishing facility configured to supply foam-like fire-extinguishing water, a curb configured to prevent a liquid having flowed out onto a ground from flowing to an outside, a catch basin configured to discharge a liquid flowing on the ground, and a surface water drainage facility configured to guide a liquid flowing on the ground to a drain ditch by inclination of the ground is provided in the machine placement region divided into the four or more firewater supply sections, the auxiliary facility is provided in one of the firewater supply sections, each serving as an installation unit, without being located in a plurality of firewater supply sections or lying over a border of a plurality of firewater supply sections.

EFFECT OF THE INVENTION

This treatment plant includes the equipment placement region divided into at least four firewater supply sections, and supplies the fire-extinguishing water exclusively to the fire-occurrence section in which a fire has occurred and the adjacent section being adjacent to the fire-occurrence section. As a result, even without partition using a safety clearance, target sections to be supplied with the fire-extinguishing water can be limited to the fire-occurrence section and the adjacent section.

DESCRIPTION OF THE EMBODIMENTS

Figure 1:
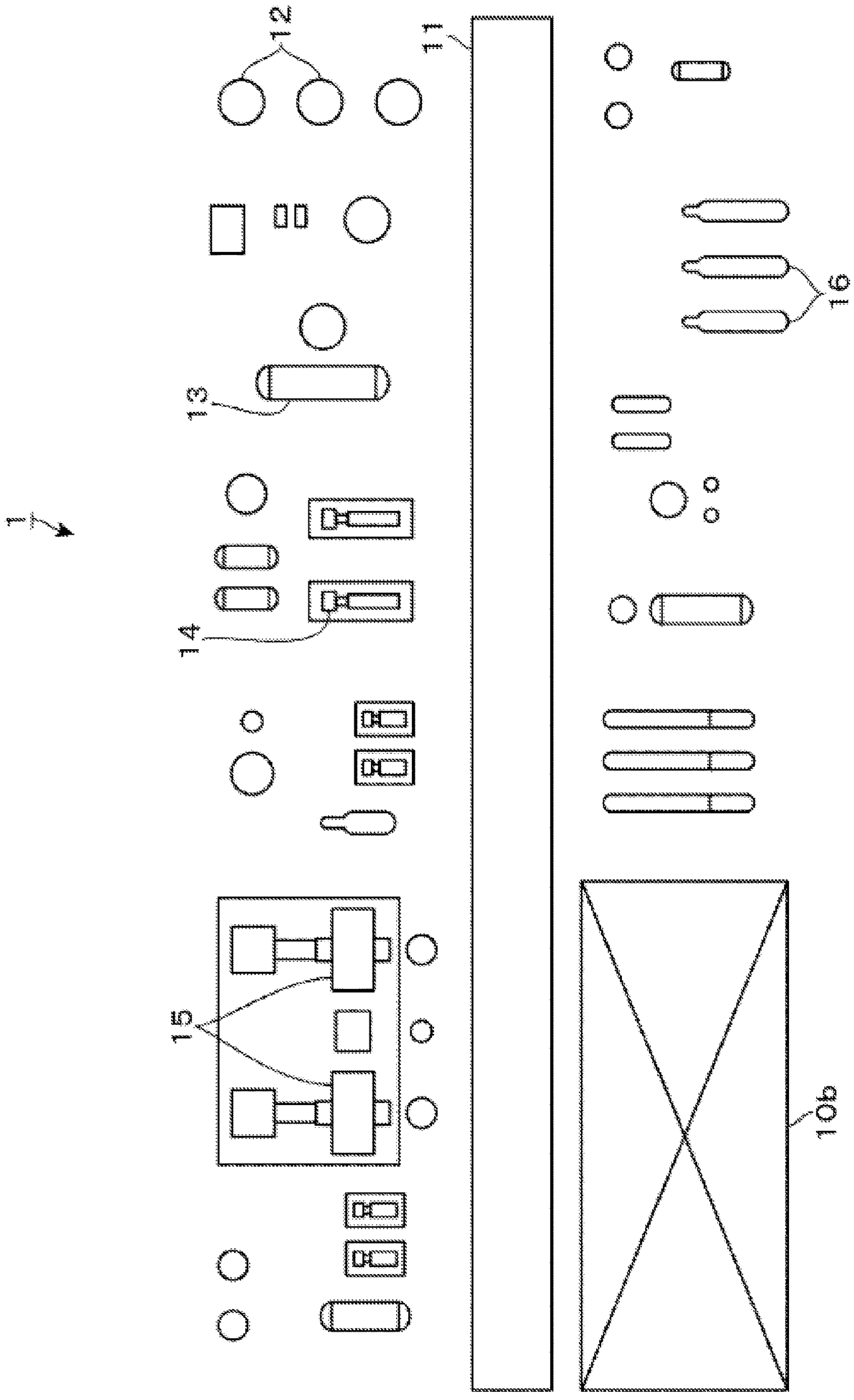
FIG. 1 is a plan view for illustrating arrangement of equipments that constitute a treatment plant.

FIG. 1 is a plan view for schematically illustrating arrangement of equipments that constitute a treatment plant 1 according to an embodiment. A kind of the treatment plant 1 is not limited to a particular one as long as the treatment plant 1 handles a flammable fluid and includes a firewater supply facility. The treatment plant 1 may be a natural gas plant, a petroleum refining plant, a chemical plant, or other plants that handle a flammable fluid or perform a treatment using a flammable fluid.

The treatment plant 1 of this example includes, as equipments that handle a flammable fluid, a large number of static equipments and dynamic equipments placed around a pipe rack 11. The static equipments include, for example, treatment towers 12, a receiver tank 13, and heat exchangers 16. The dynamic equipments include, for example, a pump 14 and compressors 15. The pipe rack 11 is a frame that holds a plurality of pipes through which a fluid flows. The fluid is to be sent and received between the plurality of equipments provided in the treatment plant 1.

Assuming that FIG. 1 represents a site of the treatment plant 1 as a whole, the pipe rack 11 of this example has an elongated rectangular shape passing across the site in plan view. The large number of equipments that handle a flammable fluid are arranged in a long-side direction of the pipe rack 11 having the rectangular shape in a distributed manner on the site. In the following description, regions of the site of the treatment plant 1 in which the equipments are placed are each also referred to as "equipment placement region".

A configuration of the arrangement of these equipments on the site is not limited to a particular one. For example, the equipments may be directly placed on a concrete foundation provided on the site, or may be placed on a mount or in a frame. A roof may be provided above equipments that are required to be prevented from getting wet with rainwater.

Further, the fluid to be handled in the equipments provided in the treatment plant 1 is not limited to a flammable fluid. For example, an equipment that handles an inflammable fluid, such as cooling water or a nitrogen gas, may also be provided. In FIG. 1 and other drawings, illustration is given of an inflammable fluid handling region 10*b* in which equipments that handle an inflammable fluid are placed. For convenience of illustration, the illustration of individual equipments in the inflammable fluid handling region 10*b* is omitted.

Still further, the large number of equipments placed on the site of the treatment plant 1 are connected through pipes for sending and receiving a fluid to be handled in the equipments. For convenience of illustration, the illustration of the pipes is also omitted in plan views of the treatment plant 1.

As illustrated in FIG. 1, in plan view of the treatment plant 1, the equipments placed in the equipment placement regions are arranged so that a separation distance between equipments adjacent to each other becomes shorter than a safety clearance distance ("x" meters) described later. For example, when the safety clearance distance, which is set to fall within a range of from 3 to 50 meters, is set to 15 meters, a separation distance between equipments adjacent to each other is set to, for example, 10 meters or shorter in each of the equipment placement regions of the treatment plant 1 of this example. Thus, a "safety clearance", which has been described in Background Art, is not set for the equipment placement regions of this treatment plant 1.

As described above, the treatment plant 1 of this example includes the plurality of equipments placed in the equipment placement regions without a safety clearance. Each of the equipment placement regions is divided into four or more firewater supply sections 10*a*. Each of the firewater supply sections 10*a* includes an equipment that handles a flammable fluid. The firewater supply section 10*a* is a unit section, which may be a target to be supplied with fire-extinguishing water by using a firewater supply facility when a fire occurs in one of the equipments placed in the equipment placement regions.

Figure 2:
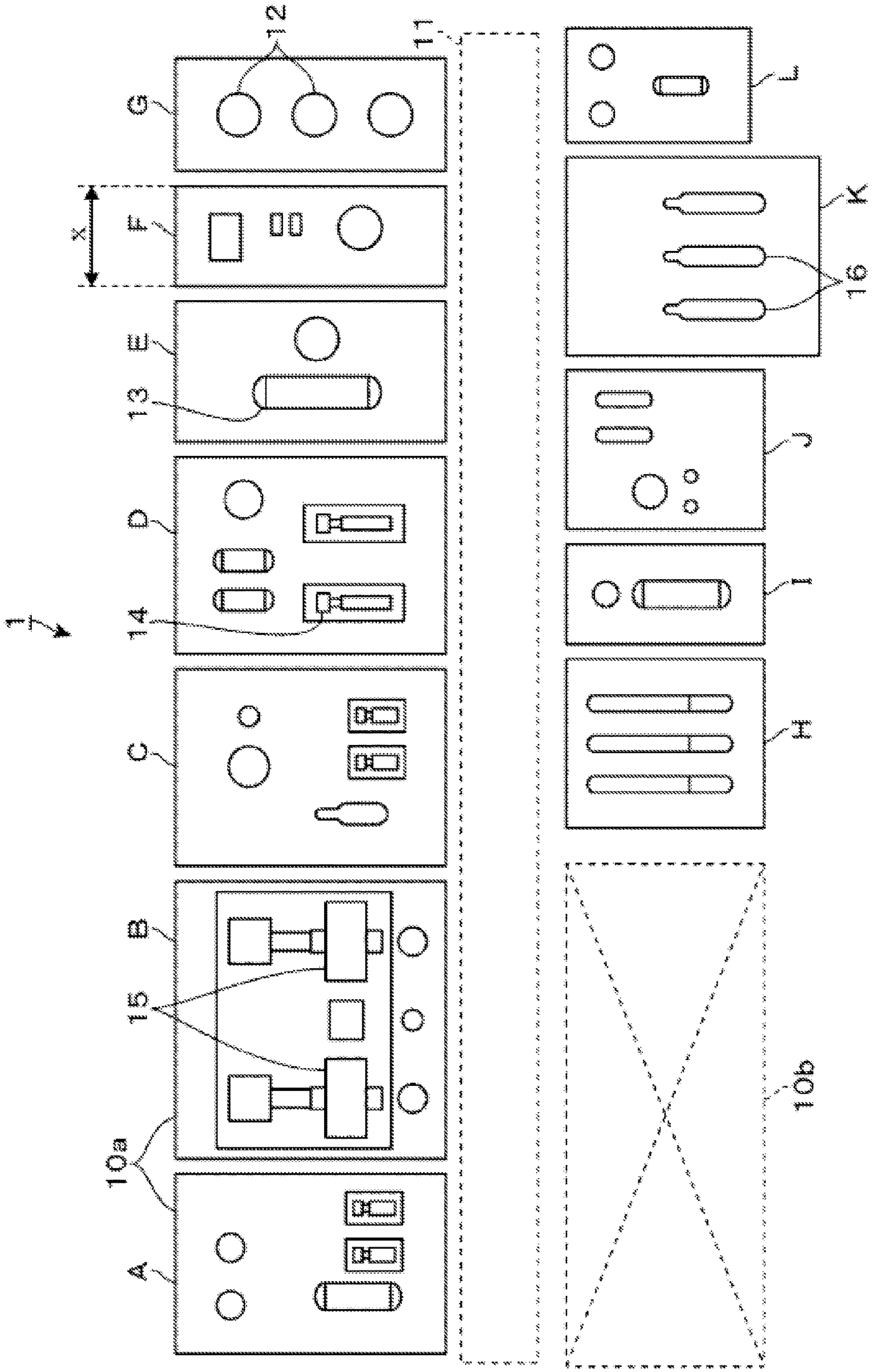
FIG. 2 is a view for illustrating an example of setting of firewater supply sections defined in placement regions for the equipments.

FIG. 2 is a plan view of the equipment placement regions of the treatment plant 1 illustrated in FIG. 1 with outlines of the firewater supply sections 10*a*.

As illustrated in FIG. 2, in the treatment plant 1 of this example, the equipment placement region, which is set along one long side (upper long side in FIG. 2) of the pipe rack 11, includes seven firewater supply sections 10*a* with the symbols A to G. Further, the equipment placement region, which is set along another long side (lower long side in FIG. 2) of the pipe rack 11, includes five firewater supply sections 10*a* with the symbols H to L. In setting of the firewater supply sections 10*a*, each of the equipments that handle a flammable fluid is placed in any one of the firewater supply sections 10*a*. Thus, the firewater supply sections 10*a* are defined so that one equipment is not placed over a border between a plurality of firewater supply sections 10*a*.

The firewater supply sections 10*a* are defined so that a distance from the firewater supply section 10*a* in which a fire has occurred (fire-occurrence section) to a second firewater supply section 10*a* next to a firewater supply section 10*a* (adjacent section) adjacent to the fire-occurrence section becomes equal to or longer than the preset safety clearance distance of "x" meters.

In this example, each of the firewater supply sections 10*a* is defined to have a rectangular shape, and a length of each of sides of the firewater supply sections 10*a*, which extend in the long-side direction of the pipe rack 11, is set equal to or larger than the safety clearance distance. However, defining the firewater supply section 10*a* to have a rectangular shape is not an essential requirement. For example, in order to prevent the placement of one equipment over a border between a plurality of firewater supply sections 10*a*, one of the outlines of two adjacent firewater supply sections 10*a*, which are adjacent to and extend in parallel to each other in a short-side direction of the pipe rack 11, may have a protruding portion to include the equipment in one of the firewater supply sections 10*a* and another one of the outlines may have a recessed portion corresponding to the protruding portion.

The safety clearance distance is set based on the concept of the safety clearance, which has been set in the related art when the equipment placement region is divided into a plurality of sections. The related-art safety clearance corresponds to a region in which equipments that handle a flammable fluid cannot be provided. Meanwhile, for the treatment plant 1 of this example, the concept of the safety clearance is employed when each of the equipment placement regions in which the equipments that handle a flammable fluid are provided is divided into the plurality of firewater supply sections 10*a*.

For example, the safety clearance distance is set based on a type of a fire occurring due to the flammable fluid handled in the treatment plant 1 or the amount of flammable fluid held in the equipments. In this manner, the safety clearance distance varies in accordance with the fluid treated in the treatment plant 1 or the amount of treated fluid, and thus it is difficult to uniquely specify the safety clearance distance. However, the safety clearance distance set within a range of from 3 meters to 50 meters can be given as an example. In the treatment plant 1 of this example, the safety clearance distance "x" is set to 15 meters, and each of the equipment placement regions is divided so that a length of each of short sides of the firewater supply sections 10*a*, each being defined to have a rectangular shape, becomes equal to or larger than the safety clearance distance.

Further, as illustrated in FIG. 2, the pipe rack 11 is provided between a row of the firewater supply sections 10*a* with the symbols C to G (equipment placement region on one side) and a row of the firewater supply sections 10*a* with the symbols H to L (equipment placement region on another side). In this manner, the safety clearance distance may be regarded as being ensured between two firewater supply sections 10*a* that are located so as to face each other across the pipe rack 11 (two firewater supply sections 10*a* are located so as to be separate from each other by the safety clearance distance).

In general, a width of the pipe rack 11 in the short-side direction falls within a range of from about 3 meters to about 15 meters, and may be smaller than the safety clearance distance in some cases. In terms of a distance between the equipments facing each other across the pipe rack 11, a larger separation distance is ensured. Thus, the safety clearance distance may be regarded as being ensured.

Meanwhile, determination may be made such that the safety clearance distance cannot be regarded as being ensured between firewater supply sections 10*a* that are arranged along part of a length of or the entire length of the pipe rack 11 so as to face each other across the pipe rack 11. The above-mentioned determination may be made, for example, when the width of the pipe rack 11 in the short-side direction is too short in comparison to the safety clearance distance set for the treatment plant 1 or when a large amount of flammable fluid is held in the pipes each having a large diameter, which are held in the pipe rack 11.

A plurality of fire-extinguishing water supply facilities are installed on the site of the treatment plant 1 in association with the plurality of firewater supply sections 10*a* that are defined based on the above-mentioned principle.

Figure 3:
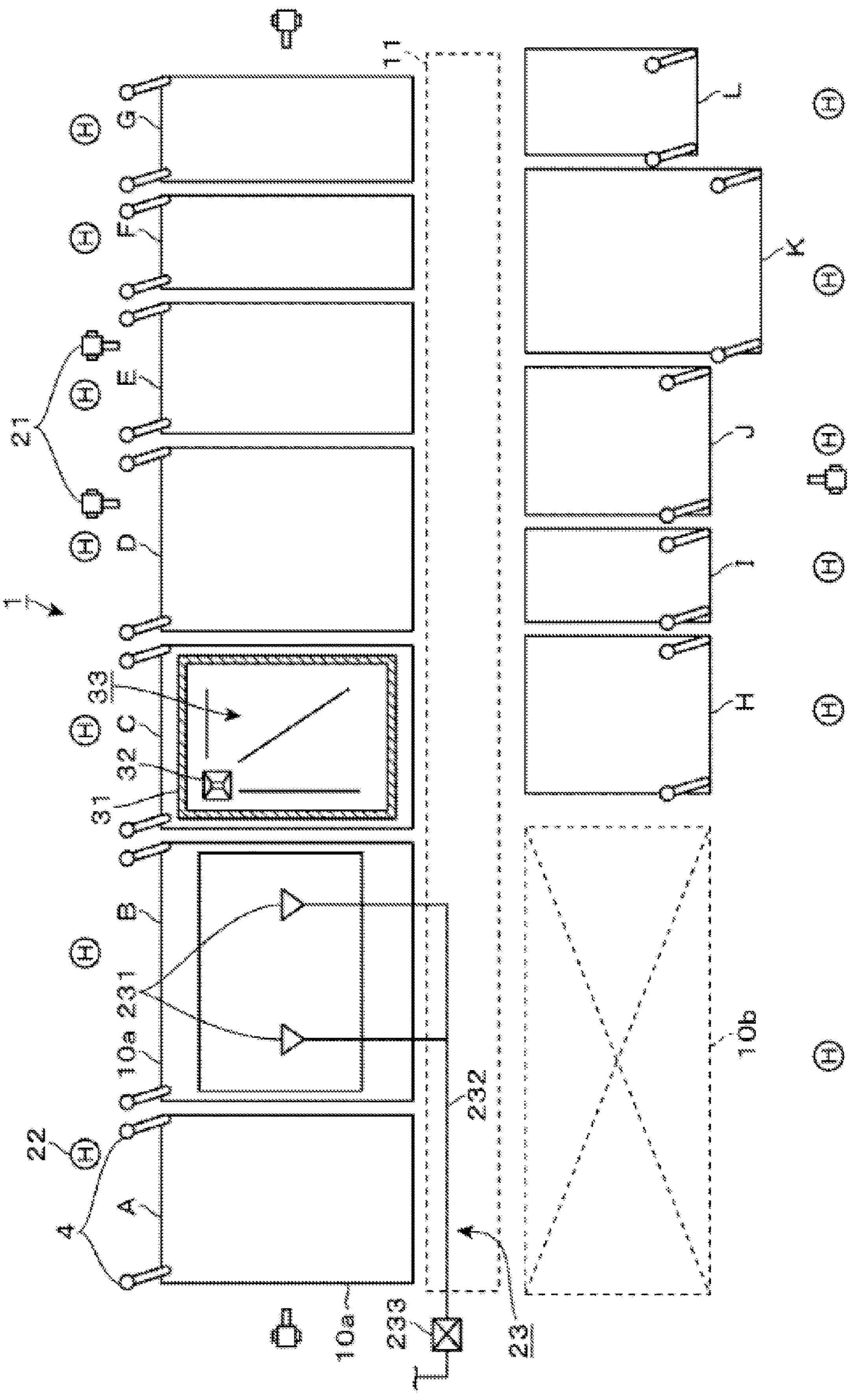
FIG. 3 is a view for illustrating an example of arrangement of fire-extinguishing water supply facilities and ancillary facilities in the firewater supply sections.

FIG. 3 is a plan view for illustrating positions at which the fire-extinguishing water supply facilities and ancillary facilities described later are arranged in the treatment plant 1 of this example with the firewater supply sections 10*a* that have been described with reference to FIG. 2. In FIG. 3 and other plan views of the treatment plant 1 (or treatment plants 1*a* and 1*b* described later), the illustration of the equipments is omitted.

The firewater supply facility is a facility that supplies, when a fire occurs, fire-extinguishing water or fire-extinguishing liquid mixed with fire-extinguishing water (hereinafter also collectively referred to simply as "fire-extinguishing water") to an equipment in which the fire has occurred and equipments in the vicinity thereof.

The treatment plant 1 of this example includes at least one kind of firewater supply facility selected from a firewater supply facility group including a fire hydrant 22, a fire monitor 21, a water spray facility 23, and a foam fire-extinguishing facility.

The fire hydrant 22 is a facility that is connected to a fire monitor truck or a fire hose and supplies fire-extinguishing water to the fire monitor truck or the fire hose. In this example, at least one fire hydrant 22 is provided to each of the firewater supply sections 10*a*. The fire hydrant 22 is arranged at a position outside a corresponding one of the firewater supply sections 10*a*, from which the fire-extinguishing water can be supplied.

The fire monitor 21 is a facility that includes a monitor nozzle and supplies fire-extinguishing water to a target equipment or area to which water is to be directed. In this example, the fire monitor 21 is arranged at a position outside a preselected one of the firewater supply sections 10*a*, from which the fire-extinguishing water can be supplied to a specific equipment or area in the preselected firewater supply section 10*a*.

The fire monitor 21 is a facility that includes a monitor nozzle and supplies fire-extinguishing water to a target equipment or area to which water is to be directed. In this example, the fire monitor 22 is arranged at a position outside a preselected one of the firewater supply sections 10*a*, from which the fire-extinguishing water can be supplied to a specific equipment or area in the preselected firewater supply section 10*a*.

The water spray facility 23 is a facility that supplies fire-extinguishing water from above the equipments placed in the firewater supply section 10*a*. For example, the water spray facility 23 includes delivered-water supply heads 231, a deluge valve 233, and a firewater line 232. The delivered-water supply heads 231 spray and supply fire-extinguishing water. The deluge valve 233 supplies fire-extinguishing water to the delivered-water supply heads 231.

The firewater line 232 connects the delivered-water supply heads 231 and the firewater line 232. The water spray facility 23 may be of automatic type that automatically operates the deluge valve 233 in association with detection of a fire through a fire detector (not shown), or may be of manual type that manually operates the deluge valve 233. Further, the water spray facility 23 may have functions of both of the automatic type and the manual type. The arrangement of the water spray facility 23 in the treatment plant 1 of this example is described later.

The foam fire-extinguishing facility (not shown in FIG. 3) is a facility that mixes fire-extinguishing water and an undiluted solution and supplies a foam-like fire-extinguishing liquid from above the equipments placed in the firewater supply section 10*a*. For example, the foam fire-extinguishing facility includes a foam head, a deluge valve, a fire-extinguishing liquid line, an undiluted-solution tank, and a fire-extinguishing water supply unit. The foam head discharges the foam-like fire-extinguishing liquid. The deluge valve supplies the fire-extinguishing liquid to the foam head. The fire-extinguishing liquid line connects the foam head and the deluge valve. The undiluted-solution tank is connected to the deluge valve, stores the undiluted solution for the fire-extinguishing liquid, and mixes the undiluted solution with the fire-extinguishing water. The fire-extinguishing water supply unit supplies the fire-extinguishing water to the undiluted-solution tank. The foam fire-extinguishing facility may be of automatic type that automatically operates the deluge valve in association with the detection of a fire through a fire detector (not shown), or may be of manual type that manually operates the foam fire-extinguishing facility. Further, the foam fire-extinguishing facility may have functions of both of the automatic type and the manual type. The arrangement of the foam fire-extinguishing facility in the treatment plant 1 of this example is described later.

Examples of the configurations and the arrangements of the fire-extinguishing water supply facilities included in the firewater supply facility group have been described. The treatment plant 1 may include other kinds of fire-extinguishing water supply facilities.

Further, a plurality of ancillary facilities to be used along with the supply of fire-extinguishing water to the firewater supply sections 10*a* may be installed in the treatment plant 1. In the treatment plant 1 of this example, the auxiliary facility refers to an equipment forming part of the firewater supply facility described above or a facility associated with adjustment of flow of the fire-extinguishing water or discharge of the fire-extinguishing water after the fire-extinguishing water is supplied to the equipment.

In the treatment plant 1 of this example, at least one kind of auxiliary facility selected from an auxiliary facility group is placed. The auxiliary facility group includes a plurality of firewater supply heads 231 of the water spray facility 23 that supplies the fire-extinguishing water, a plurality of foam heads for the foam fire-extinguishing facility that supplies the foam-like fire-extinguishing liquid, a curb 31 that is configured to prevent the liquid that has flowed out onto a ground from flowing to an outside, a catch basin 32 that is configured to discharge the liquid flowing on the ground, and a surface water drainage facility 33 that guides the liquid flowing on the ground to a drain ditch by inclination of the ground.

The above-mentioned auxiliary facility is provided in one of the firewater supply sections 10*a*, each serving as an installation unit, so that the auxiliary facility is not placed over a plurality of firewater supply sections 10*a* or a border therebetween.

For example, in FIG. 3, there are schematically illustrated a state in which two delivered-water supply heads 231, which are ancillary facilities, are provided for the compressor 15 (not shown in FIG. 3) placed in one firewater supply section 10*a* with the symbol B. These delivered-water supply heads 231 are arranged, for example, on a ceiling surface side of a roof (not show) that is provided above the compressor 15 so as to cover the compressor 15.

In contrast to the example illustrated in FIG. 3, consideration is now made on a case in which the plurality of delivered-water supply heads 231 of one water spray facility 23 are separately arranged in a plurality of firewater supply sections 10*a* that are located adjacent to each other. When the deluge valve 233 is opened, the fire-extinguishing water is supplied to both of the delivered-water supply heads 231. In this case, when one of the firewater supply sections 10*a* in which the delivered-water supply heads 231 are provided is a target to be supplied with the fire-extinguishing water, the fire-extinguishing water is inevitably supplied also to another one of the firewater supply sections 10*a*.

As described later, however, the treatment plant 1 of this example reduces usage of fire-extinguishing water by limiting the firewater supply sections 10*a* being targets to be supplied with the fire-extinguishing water to a predetermined range. In this case, when a configuration that allows the fire-extinguishing water to be always supplied to the plurality of firewater supply sections 10*a* at the same time is employed as described above, an operation of selectively supplying the fire-extinguishing water to the firewater supply sections 10*a* becomes difficult. Thus, when one water spray facility 23 includes the plurality of delivered-water supply heads 231, these delivered-water supply heads 231 are provided in one of the firewater supply sections 10*a*, each serving as an installation unit, so as not to be placed over a plurality of firewater supply sections 10*a* or over a border therebetween.

In FIG. 3, for convenience of illustration, illustration is given of an example in which the water spray facility 23 (delivered-water supply heads 231) is provided only in one firewater supply section 10*a* with the symbol B. As for the delivered-water supply heads 231, as a matter of course, the delivered-water supply heads 231 may also be provided in another one of the firewater supply sections 10*a*.

Further, the same principle is also applied to a case in which the foam fire-extinguishing facility includes a plurality of foam heads. Specifically, when one foam fire-extinguishing facility includes a plurality of foam heads, these form heads are provided in one of the firewater supply sections 10*a*, each serving as an installation unit, so as not to be placed over a plurality of firewater supply sections 10*a* or over a border therebetween.

Further, in FIG. 3, schematic illustration is given of an example in which the curb 31, the catch basin 32, and the surface water drainage facility 33 are arranged in one firewater supply section 10*a* with the symbol C.

The curb 31 is a protruding structure provided on the ground side so as to surround a predetermined region of the firewater supply section 10*a*. The curb 31 is formed of, for example, concrete or curbstone, and is provided to deter flow of a liquid (such as a flammable liquid or fire-extinguishing water), which has flowed out onto the ground of the firewater supply section 10*a*, from the region surrounded by the curb 31 to the outside.

The catch basin 32 is an opening portion for discharging the liquid flowing on the ground of the firewater supply section 10*a* toward a drain ditch (not shown). A lid having grating may be fitted into an opening of the catch basin 32.

The surface water drainage facility 33 is an inclined structure provided in the firewater supply section 10*a*. The surface water drainage facility 33 is provided on the ground of the firewater supply section 10*a* so as to guide the liquid to the drain ditch being open upward or guide the liquid toward the above-mentioned catch basin 32 being in communication with the drain ditch. When, for example, the ground of the firewater supply section 10*a* is covered with concrete, the surface water drainage facility 33 is formed by inclining an upper surface of the concrete.

Now, it is assumed a case in which the curb 31, the catch basin 32, and the surface water drainage facility 33, which are the ancillary facilities, are placed in a shared manner over a plurality of firewater supply sections 10*a* or over a border therebetween. In a case in which outflow of the flammable fluid has occurred in one of the firewater supply sections 10*a*, there arises a risk in that the flammable fluid may flow into an adjacent one of the firewater supply sections 10*a*, which shares the curb 31 and the surface water drainage facility 33. Further, also when the catch basin 32 is shared, a flammable gas generated through volatilization of a liquid may flow out toward an adjacent one of the firewater supply sections 10*a* via the opening of the catch basin 32. As a result, when a fire occurs, the fire-extinguishing water must be constantly supplied to a plurality of firewater supply sections 10*a* that share the ancillary facilities simultaneously. Thus, an operation of selectively supplying the fire-extinguishing water to the firewater supply sections 10*a* becomes difficult.

Thus, the ancillary facilities are also provided in one of the firewater supply sections 10*a*, each serving as an installation unit, so as not to be placed over a plurality of firewater supply sections 10*a* or over a border therebetween.

In FIG. 3, for convenience of illustration, illustration is given of an example in which the curb 31, the catch basin 32, and the surface water drainage facility 33 are provided only in one firewater supply section 10*a* with the symbol C. As for the ancillary facilities, as a matter of course, the ancillary facilities may also be provided in another one of the firewater supply sections 10*a*, which serves as an installation unit.

The plurality of firewater supply sections 10*a*, which have been described with reference to FIG. 2 and FIG. 3, are defined in setting for determination of a target section to be supplied with fire-extinguishing water from the fire-extinguishing water supply facilities. Meanwhile, in practice, as illustrated in FIG. 1, the equipment placement region is merely a part of the ground on which a plurality of equipments are placed. Thus, the outlines of the firewater supply sections 10*a* or a border between adjacent ones of the firewater supply sections 10*a* are sometimes difficult to discern in appearance.

Thus, as schematically illustrated in FIG. 3, color poles 4 may be placed in corners of each of the firewater supply sections 10*a* so as to mark the border between adjacent firewater supply sections 10*a*. Further, the outlines of the firewater supply sections 10*a* may be emphasized with use of, for example, paint on an upper surface of concrete that covers the ground of the firewater supply sections 10*a*.

Figure 4:
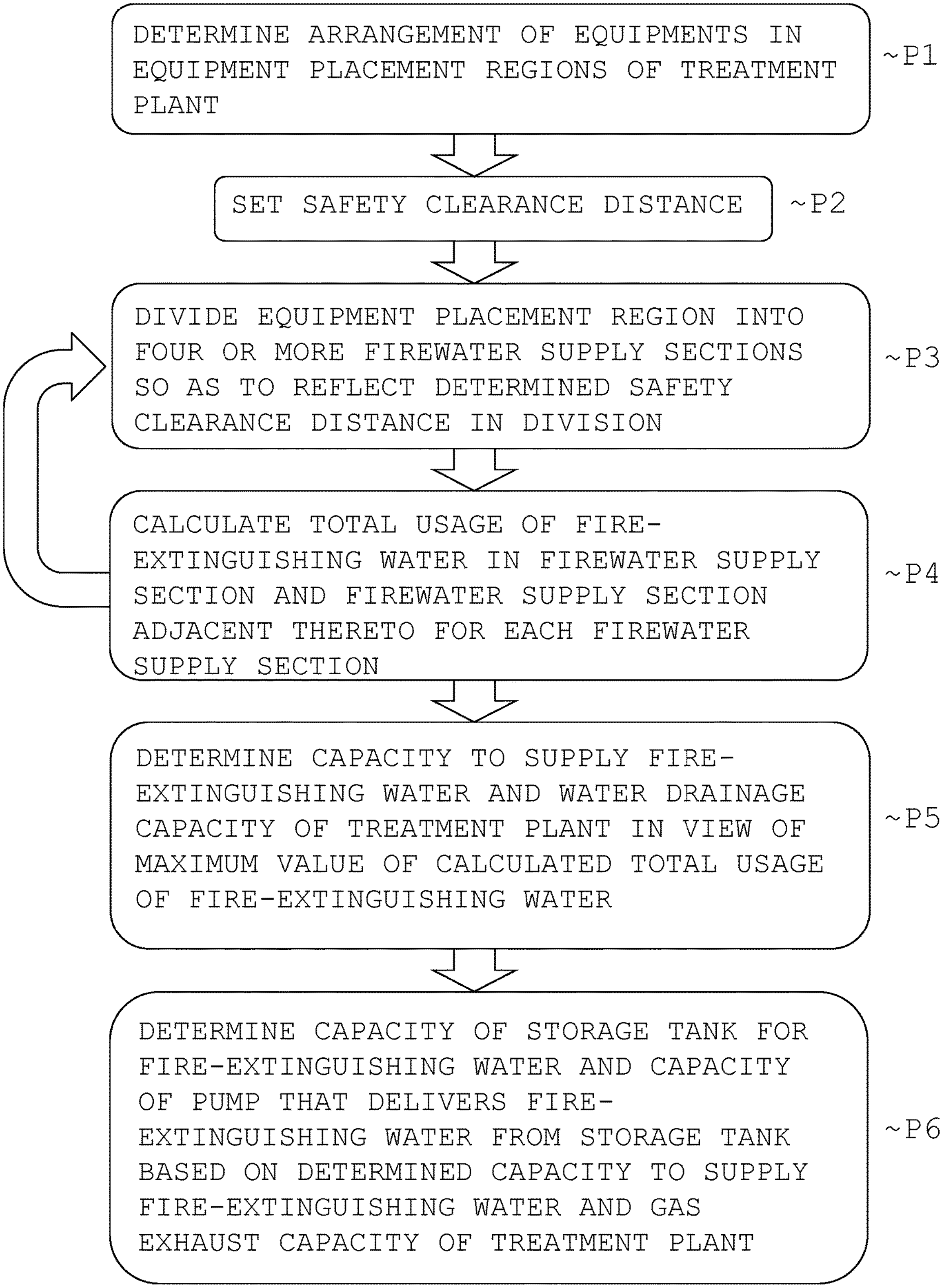
FIG. 4 is an explanatory view for illustrating a process of designing the treatment plant.

FIG. 4 is a process flowchart for illustrating a process of designing the treatment plant 1 in which the firewater supply sections 10*a* illustrated in FIG. 2 and FIG. 3 are determined.

First, the arrangement of the equipments in the equipment placement regions of the treatment plant 1 is determined (Step P1). For example, a position at which the pipe rack 11 is placed and a size of the frame that forms the pipe rack 11 are determined in this step.

Further, in the treatment plant 1 of this example, defining a plurality of equipment placement regions with use of a safety clearance is not an indispensable requirement. When, for example, an area of the site of the treatment plant 1 is sufficiently large, however, there is not precluded a case in which a safety clearance in which an equipment that handles a flammable fluid is not provided is set so that a plurality of equipment placement regions are defined by the safety clearance. Even in such a case, it may still be necessary to divide each of the equipment placement regions into four or more firewater supply sections 10*a*.

Next, the safety clearance distance in the treatment plant 1 is set (Step P2). As described above, the safety clearance distance is set based on, for example, the type of a fire occurring due to a flammable fluid handled in the treatment plant 1 or the amount of fluid flowing through the equipments. Further, the safety clearance distance may be set by using, for example, a simulator and referring to results of fire or explosion simulations.

As described above, the safety clearance distance set to fall within a range of from 3 meters to 50 meters is given as an example.

Each of the equipment placement regions of the treatment plant 1 is divided into four or more firewater supply sections 10*a* so that the determined safety clearance distance is reflected in the division (Step P3). In this case, when the firewater supply sections 10*a* are defined so that a distance from one of the firewater supply sections 10*a* to a second firewater supply section 10*a* next to the firewater supply section 10*a* adjacent to the one firewater supply section 10*a* becomes equal to or larger than the safety clearance distance, the safety clearance distance is reflected in the division.

As in the example illustrated in FIG. 2, when each of the elongated equipment placement regions extending in the long-side direction of the pipe rack 11 is divided into a plurality of firewater supply sections 10*a* each having a rectangular shape, a length of sides of each of the firewater supply sections 10*a*, which extend in the long-side direction of the pipe rack 11, is set equal to or larger than the safety clearance distance.

After that, a total amount of fire-extinguishing water used for one firewater supply section 10*a* and the firewater supply section 10*a* adjacent thereto is calculated for each of the firewater supply sections 10*a* (Step P4).

Among the fire-extinguishing water supply facilities that use the fire-extinguishing water, for example, the fire hydrants 22 are arranged apart by a distance equal to or smaller than a preset installation distance. In the example illustrated in FIG. 3, at least one fire hydrant 22 is arranged at a position at which the fire hydrant 22 faces one side of each of the firewater supply sections 10*a*. A target equipment to be supplied with the fire-extinguishing water by the fire monitor 21 is determined in advance for the fire monitor 21. Thus, the fire monitor 21 is arranged at a position at which the fire monitor 21 faces one side of the firewater supply section 10*a* in which the target equipment is placed. Further, a surface area of a target equipment to be supplied with the fire-extinguishing water determines the amount of fire-extinguishing water used by the water spray facility 23 or the foam fire-extinguishing facility.

To calculate the total usage of fire-extinguishing water in Step P4, kinds and the number of fire-extinguishing water supply facilities to be installed in each of the firewater supply sections are required to be examined in advance. Further, it is preferred that, among the ancillary facilities, a range of installation and the number of firewater supply heads 231 of the water spray facility 23 or foam heads for the foam fire-extinguishing facility to be installed be examined before Step P4.

As described above, when the range of each of the firewater supply sections 10*a* and the equipments to be placed in the firewater supply sections 10*a* are determined, the usage of fire-extinguishing water in each of the fire-extinguishing water supply facilities provided in association with the firewater supply sections 10*a* is also determined. Then, when the total usage of the fire-extinguishing water in these fire-extinguishing water supply facilities (the fire hydrants 22, the fire monitors 21, the water spray facility 23, the foam fire-extinguishing facility, and other kinds of fire-extinguishing water supply facilities) is obtained, the usage of fire-extinguishing water in each of the firewater supply sections 10*a* can be specified.

After the usage of fire-extinguishing water is calculated, total usage of fire-extinguishing water in one of the firewater supply sections 10*a* and the firewater supply section 10*a* adjacent thereto is calculated for each of the firewater supply sections 10*a*.

For example, when each of the elongated equipment placement regions illustrated in FIG. 2 is divided into the firewater supply sections 10*a*, each having a rectangular shape, the firewater supply section 10*a* at each of right and left ends has only one firewater supply section 10*a* adjacent thereto. Thus, the total usage of fire-extinguishing water in two firewater supply sections 10*a* (for example, the firewater supply sections 10*a* with the symbols A and B, or the firewater supply sections 10*a* with the symbols L and K) is calculated.

Further, each of the firewater supply sections 10*a* located on an inner side of the right and left ends has two firewater supply sections 10*a* adjacent thereto. Thus, the total usage of fire-extinguishing water in three firewater supply sections 10*a* (for example, the firewater supply sections 10*a* with the symbols B, A, and C, or the firewater supply sections 10*a* with the symbols K, L, and J) is calculated.

In the treatment plant 1, an upper limit of a capacity to supply fire-extinguishing water available at a time is set in some cases in view of, for example, a capacity of a water storage tank for fire-extinguishing water or a water pumping capacity of a pump that delivers fire-extinguishing water from the water storage tank. For each of the firewater supply sections 10*a*, after the above-mentioned total usage of fire-extinguishing water is calculated, a maximum value of the calculated total usage is compared with the upper limit of the capacity to supply fire-extinguishing water. When the maximum value of the total usage of fire-extinguishing water is less than the upper limit, the process proceeds to a next step.

Meanwhile, when the maximum value of the total usage of fire-extinguishing water is equal to or larger than the upper limit, the amount of supply may be smaller than the usage of the fire-extinguishing water in the firewater supply section 10*a* and the firewater supply section 10*a* adjacent thereto. Thus, in this case, the process returns to Step P3 to redefine the firewater supply sections 10*a*.

For redefining the sections, for example, a position of a boundary of the firewater supply section 10*a* that uses a relatively large amount of fire-extinguishing water may be moved so that part of the equipments is moved into the firewater supply section 10*a* adjacent thereto. Further, the number of firewater supply sections 10*a* to be defined in each of the equipment placement regions may be increased. In any case, however, it is preferred that the principle of definition of the sections be complied with so that a distance from each one of the firewater supply sections 10*a* to a second firewater supply section 10*a* next to a firewater supply section 10*a* adjacent to the one firewater supply section 10*a* be set equal to or larger than the safety clearance distance for each of the firewater supply sections 10*a*.

After the maximum value of the total usage of fire-extinguishing water in one of the firewater supply sections 10*a* and the firewater supply section 10*a* adjacent thereto, which is calculated for each of the firewater supply sections 10*a*, becomes smaller than the upper limit of the capacity to supply fire-extinguishing water, the firewater supply sections 10*a* are definitively determined. Then, in view of the maximum value of the calculated total usage of the fire-extinguishing water, the capacity to supply fire-extinguishing water and the water drainage capacity of the treatment plant 1 are determined (Step P5).

When the maximum value of the total usage of the fire-extinguishing water is significantly smaller than the upper limit of the capacity to supply fire-extinguishing water, the capacity of the storage tank for the fire-extinguishing water and the water pumping capacity of the pump may be reduced to lower facility cost associated with the supply of the fire-extinguishing water.

Further, also for a size of a water drainage system drain ditch and design of a drained water treatment facility, a facility capacity is determined in view of the maximum value of the total usage of the fire-extinguishing water so that discharge of the fire-extinguishing water and a drained water treatment are enabled even when the amount of fire-extinguishing water corresponding to the maximum value is supplied.

Further, when the treatment plant 1 is constructed in an area with high precipitation and an estimated water drainage amount in view of precipitation on the site of the treatment plant 1 is larger than the maximum value of the total amount of supplied fire-extinguishing water, the water drainage capacity of the treatment plant 1 may be determined based on the estimated water drainage amount.

After the capacity to supply fire-extinguishing water and the water drainage capacity of the treatment plant 1 are determined, the capacity of the storage tank for fire-extinguishing water and the capacity of the pump that delivers the fire-extinguishing water from the storage tank are determined based on the determined capacity to supply fire-extinguishing water and the water drainage capacity of the treatment plant 1 (Step P6).

For the treatment plant 1 that has been designed through the steps described above, actions associated with the supply of fire-extinguishing water to the treatment plant 1, which are performed when a fire occurs in an equipment provided in one treatment plant 1, are described.

Figure 5A:
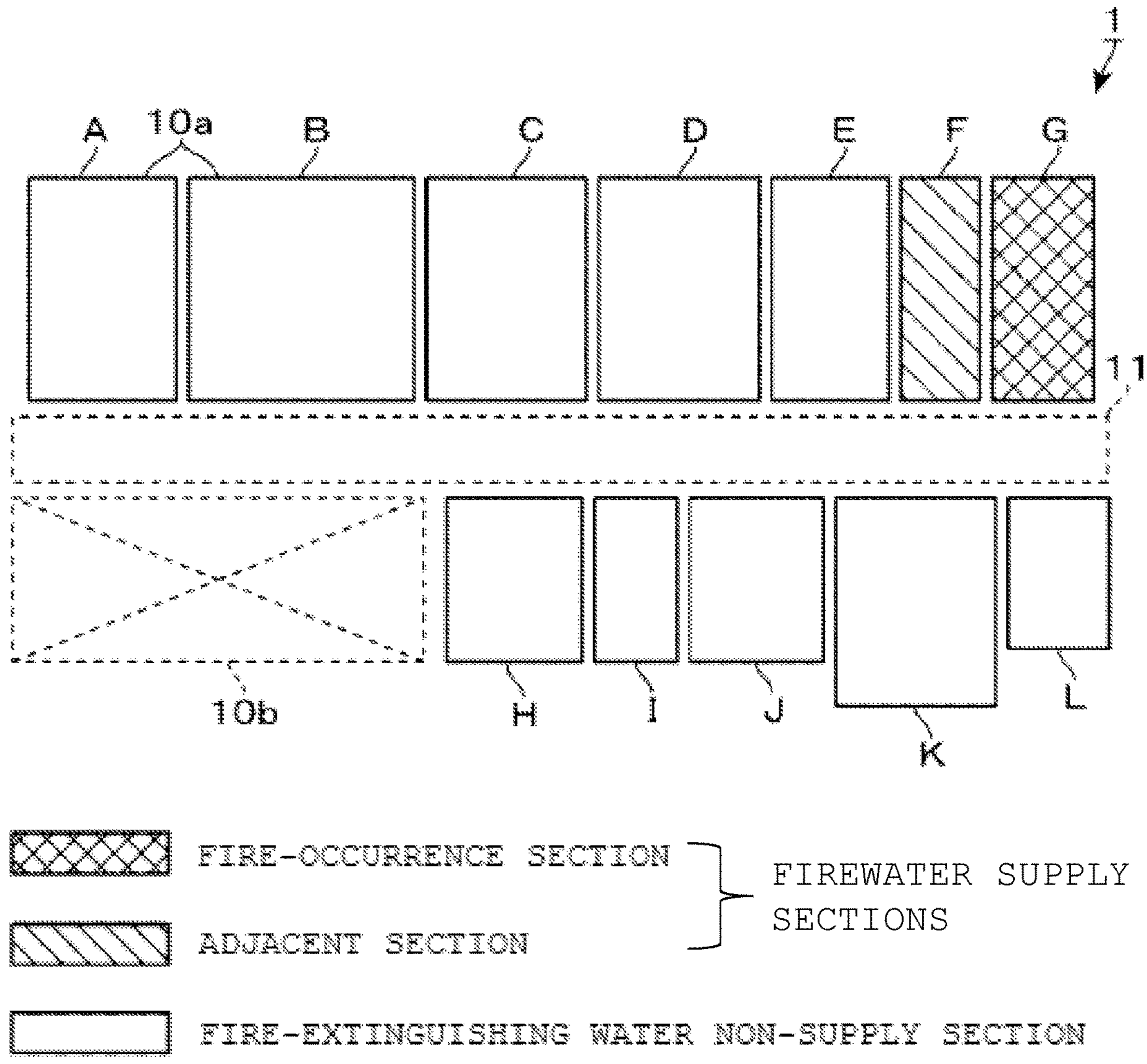
FIG. 5A is a first explanatory view associated with supply of fire-extinguishing water when a fire occurs in the treatment plant.

FIG. 5A is an illustration of target sections to be supplied with the fire-extinguishing water when the firewater supply section 10*a* with the symbol G, which is located at an end of one of the equipment placement regions, becomes a fire-occurrence section (cross-hatched section). In this case, in addition to the fire-occurrence section, an adjacent section (hatched section) with the symbol F, which is adjacent to the fire-occurrence section, is also a target section to be supplied with the fire-extinguishing water.

When the fire-extinguishing water is also supplied to the adjacent section with the symbol F, the adjacent section serves as an safety clearance to prevent the fire from spreading to the equipments placed in the firewater supply section 10*a* with the symbol E and the firewater supply sections 10*a* farther than the firewater supply section 10*a* with the symbol E from the fire-occurrence section. Further, the spread of the fire to the equipments placed in the firewater supply section 10*a* with the symbol L, which is located facing the firewater supply section 10*a* with the symbol G across the pipe rack 11, is also prevented.

Similarly, when any one of the firewater supply sections 10*a* with the symbols A, H, and L becomes a fire-occurrence section, not only the fire-occurrence section but also an adjacent section of the firewater supply sections 10*a*, which is a section adjacent to the fire-occurrence section, are set as target sections to be supplied with the fire-extinguishing water, the spread of the fire to the equipments placed in the firewater supply sections 10*a* located farther than the adjacent section from the fire-occurrence section, can be prevented.

The above-mentioned examples are summarized as follows. When a fire occurs in any one of the firewater supply sections 10*a* located at the ends of one of the equipment placement regions, two firewater supply sections 10*a* in total including the fire-occurrence section and one adjacent section adjacent to the fire-occurrence section are set as target sections to be supplied with fire-extinguishing water. As a result, the spread of the fire to the equipments placed in other firewater supply sections 10*a* can be prevented.

Figure 5B:
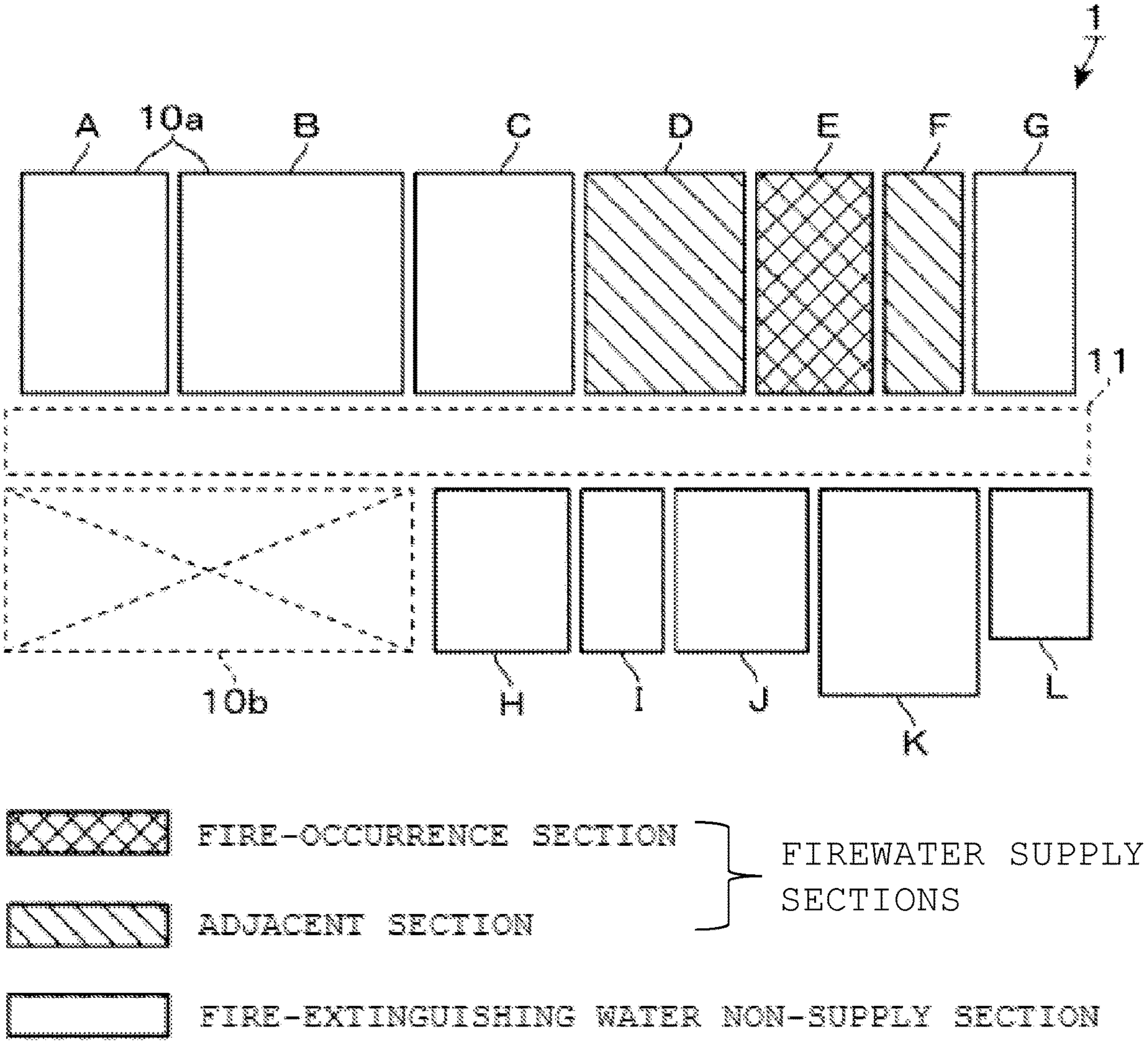
FIG. 5B is a second explanatory view associated with the supply of the fire-extinguishing water in the treatment plant.

FIG. 5B is an illustration of target sections to be supplied with the fire-extinguishing water when the firewater supply section 10*a* with the symbol E, which is located on an inner side of the end of one of the equipment placement regions, becomes a fire-occurrence section. In this case, in addition to the fire-occurrence section, adjacent sections with the symbols D and F, which are adjacent to both sides of the fire-occurrence section, are also target sections to be supplied with the fire-extinguishing water.

When the fire-extinguishing water is also supplied to the adjacent sections with the symbols D and F, the adjacent sections serve as safety clearances to prevent the fire from spreading to the equipments placed in the firewater supply section 10*a* with the symbol C and the firewater supply sections 10*a* farther than the firewater supply section 10*a* with the symbol C from the fire-occurrence section. Further, the spread of the fire to the equipments placed in the firewater supply sections 10*a* with the symbols J and K, which are located facing the firewater supply sections 10*a* with the symbols J and K across the pipe rack 11, is also prevented.

Similarly, when any one of the firewater supply sections 10*a* with the symbols B to D and I to K becomes a fire-occurrence section, not only the fire-occurrence section but also an adjacent section of the firewater supply sections 10*a*, which are two section adjacent to both sides of the fire-occurrence section, are set as target sections to be supplied with the fire-extinguishing water, the spread of the fire to the equipments placed in the firewater supply sections 10*a* located farther than the adjacent section from the fire-occurrence section, can be prevented.

The above-mentioned examples are summarized as follows. When a fire occurs in any one of the firewater supply sections 10*a* located on an inner side of the ends of one of the equipment placement regions, three firewater supply sections 10*a* in total including the fire-occurrence section and two adjacent sections adjacent to both sides of the fire-occurrence section are set as target sections to be supplied with fire-extinguishing water. As a result, the spread of the fire to the equipments placed in other firewater supply sections 10*a* can be prevented.

Figure 6:
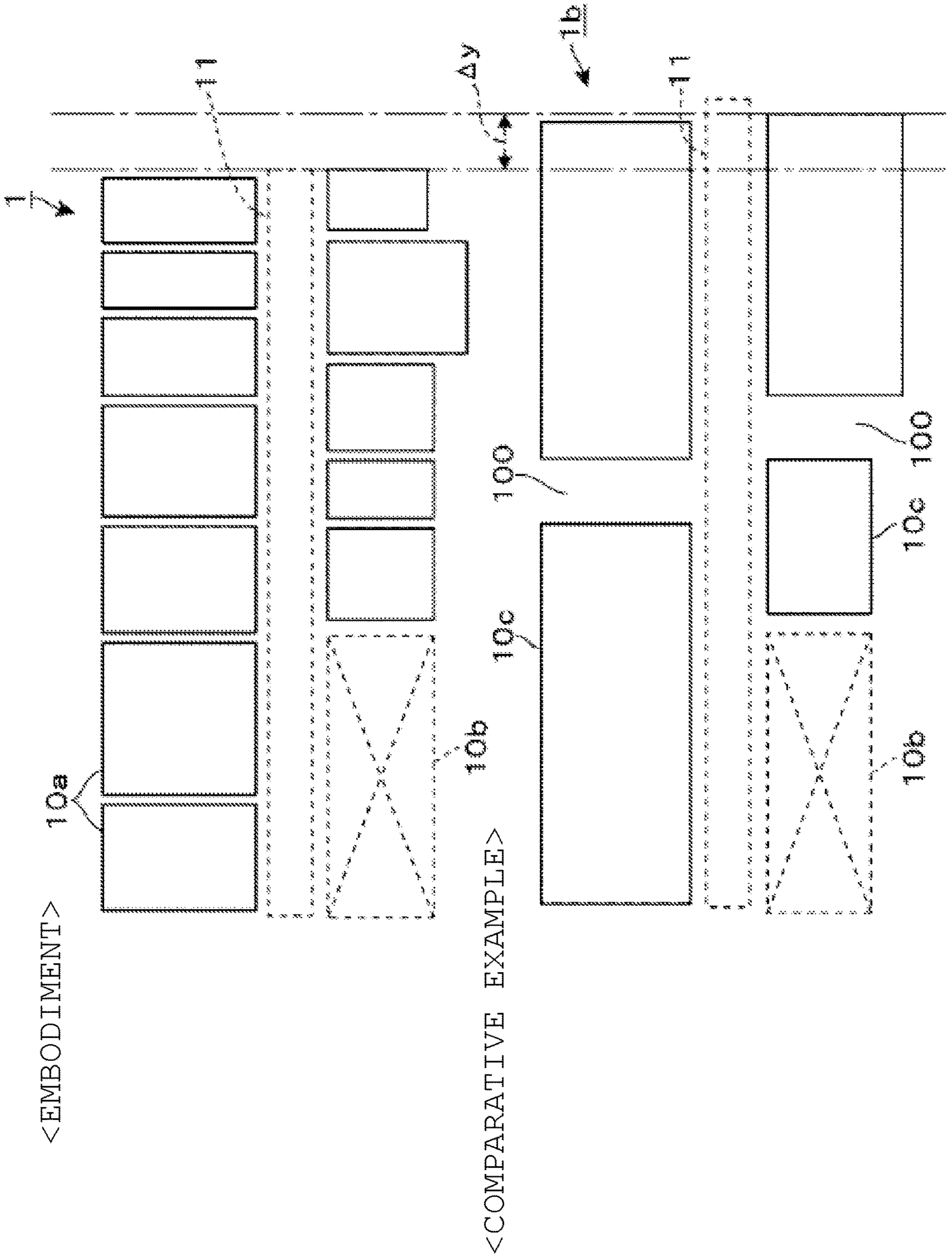
FIG. 6 is a comparison diagram for comparing a treatment plant according to an embodiment and a treatment plant of a comparative example.

FIG. 6 is a plan view for comparison between the treatment plant 1 according to the embodiment, which has been described with reference to FIG. 1 to FIGS. 5A and 5B, and a treatment plant 1*b* of a comparative example in which a plurality of equipment placement regions 10*c* are defined by setting safety clearances 100.

The treatment plant 1*b* of the comparative example includes the equipment placement regions 10*c* defined by the safety clearances 100. When a large number of safety clearances 100 are set to define the equipment placement regions 10*c*, an area of a site of the treatment plant 1*b* disadvantageously increases. Meanwhile, when the number of safety clearances 100 is reduced to restrain an increase in area of the site of the treatment plant 1*b*, an area of each of the equipment placement regions increases.

Hitherto, when the firewater supply facility is provided for the equipment placement region 10*c*, a capacity to supply fire-extinguishing water is required to be designed for the treatment plant 1*b* so that the fire-extinguishing water can be supplied to the entire equipment placement region 10*c* so as to reach a border with the safety clearance. In view of such a requirement, when an area of each equipment placement region 10*c* increases, the capacity to supply fire-extinguishing water (size of a storage tank for fire-extinguishing water or water pumping capacity of a supply pump) for the whole treatment plant 1*b* must also be increased.

In comparison to the treatment plant 1*b* of the comparative example, which has been examined, the treatment plant 1 according to the embodiment does not include the safety clearances 100 in which equipments that handle a flammable fluid cannot be placed. As a result, the area of the site of the treatment plant 1 can be reduced ("Ay" in FIG. 6).

Then, when one equipment placement region is divided into at least four firewater supply sections 10*a* and a fire occurs in one of the equipments provided in one of the firewater supply sections 10*a*, the fire-occurrence section and the adjacent section being adjacent to the fire-occurrence section are set as target sections to be supplied with fire-extinguishing water. As a result, the adjacent section serves as the safety clearance to prevent the fire from spreading to the equipments placed in the firewater supply sections 10*a* farther from the fire-occurrence section.

Further, the number of target sections to be supplied with fire-extinguishing water is set to three at most. Thus, in comparison to a case in which the whole equipment placement region is a target to be supplied with fire-extinguishing water, the usage of fire-extinguishing water can be reduced.

The treatment plant 1 according to the embodiment has the following effects. The equipment placement region is divided into at least four firewater supply sections 10*a*, and the fire-extinguishing water is supplied exclusively to the fire-occurrence section in which a fire has occurred and the adjacent section being adjacent to the fire-occurrence section. As a result, the target sections to be supplied with fire-extinguishing water can be limited to the fire-occurrence section and the adjacent section without defining the sections by a safety clearance.

The above-mentioned configurations reduce the usage of fire-extinguishing water used when a fire occurs while restraining an increase in area of the site of the treatment plant 1. In this manner, an increase in size of the facilities associated with the supply of fire-extinguishing water can be reduced to restrain an increase in facility cost.

Figure 7A:
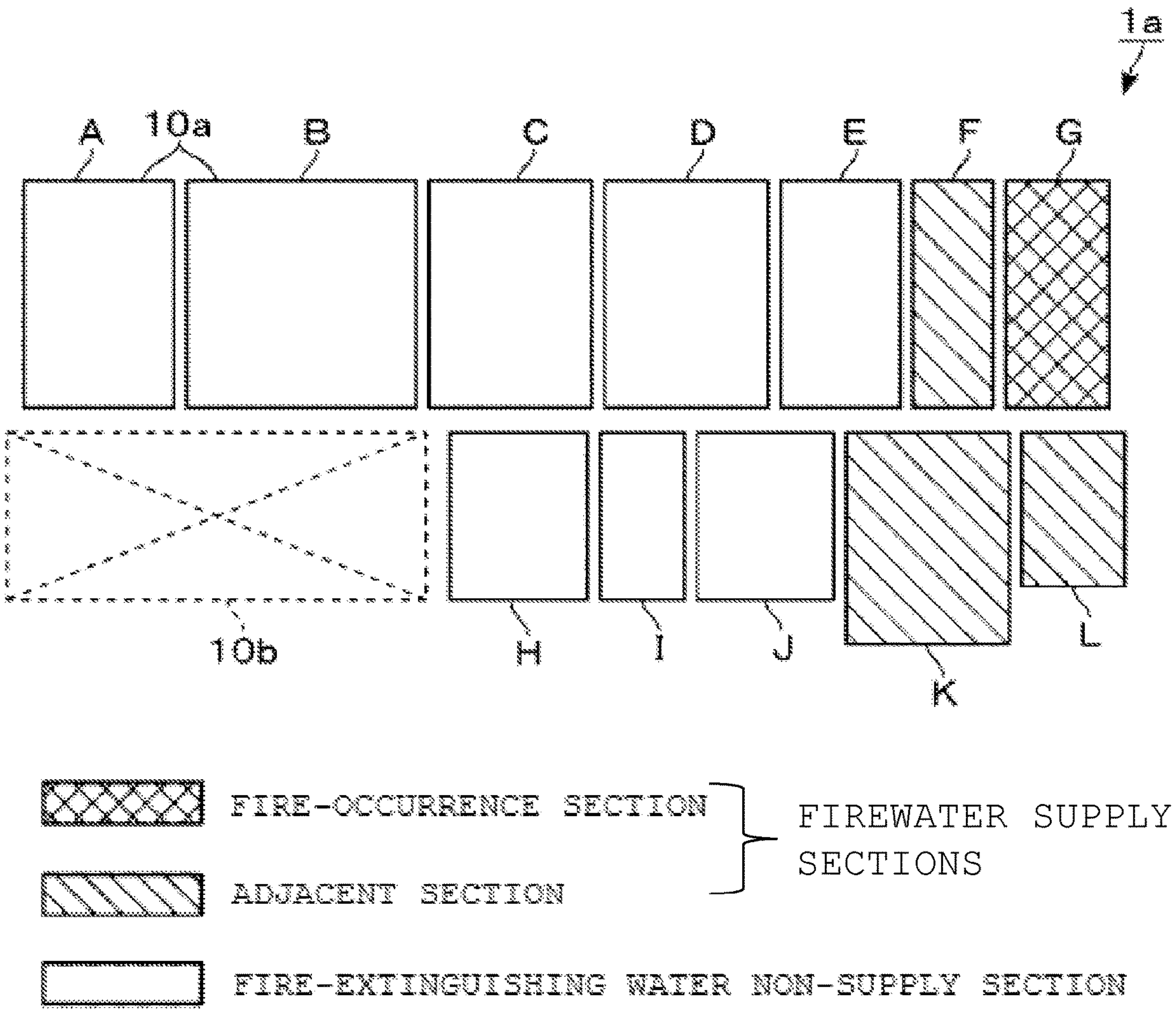
FIG. 7A is a first explanatory view associated with the supply of the fire-extinguishing water when a fire occurs in a treatment plant of another example.
Figure 7B:
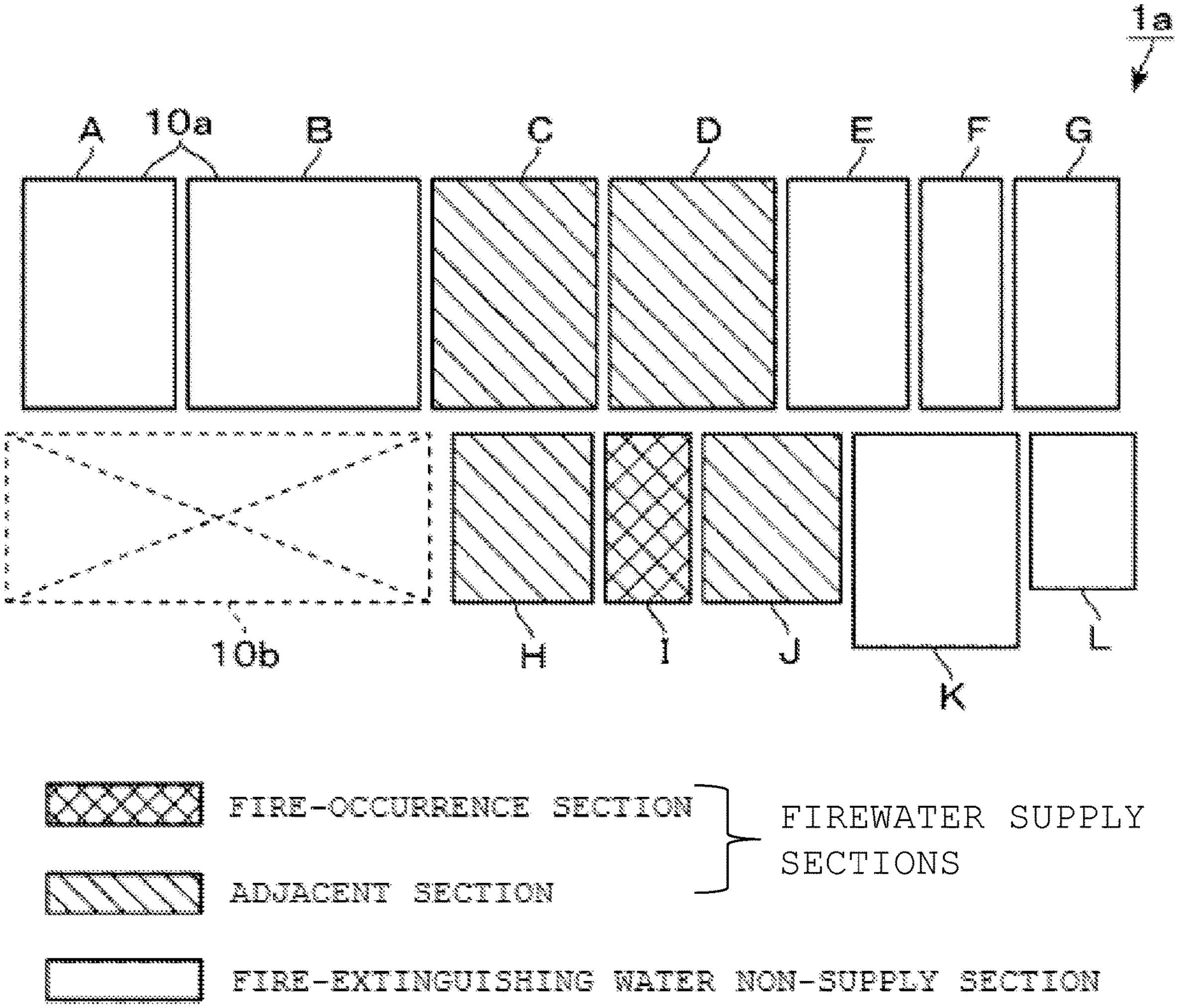
FIG. 7B is a second explanatory view associated with the supply of the fire-extinguishing water in the treatment plant of the another example.

Next, FIG. 7A and FIG. 7B are plan views of a treatment plant 1*a* according to another embodiment without the pipe rack 11.

A configuration of the treatment plant 1*a* is the same as the configuration of the treatment plant 1 according to the embodiment described with reference to FIG. 1 to FIG. 3 except that the pipe rack 11 is not provided. Equipment placement regions are set in two rows so as to be separate from each other in an up-and-down direction in FIG. 7A and FIG. 7B. When the equipment placement regions, each having an elongated shape, are arranged in the up-and-down direction, it is considered that the arrangement of up to two equipment placement regions in the up-and-down direction is practical in consideration of arrangement of a crane for disassembling and carrying out the equipments, which may be placed at a time of, for example, maintenance. Further, each of the equipment placement regions is divided into the firewater supply sections 10*a* in the same manner as in the treatment plant 1 according to the embodiment.

In both of a case in which the firewater supply section 10*a* with the symbol G, which is located at an end of one of the equipment placement regions illustrated in FIG. 7A, becomes a fire-occurrence section and a case in which the firewater supply section 10*a* with the symbol I, which is located at an end of one of the equipment placement regions illustrated in FIG. 7B, becomes a fire-occurrence section, the number of adjacent sections increases. In comparison to a case in which the entire equipment placement region without the safety clearances 100 is a target section to be supplied with fire-extinguishing water, however, the amount of supplied fire-extinguishing water can be significantly reduced.

DESCRIPTION OF REFERENCE NUMERALS

1'1*a*'1*b*
treatment plant
10*a* firewater supply sections
10*c* equipment placement regions
11 pipe rack
21 fire monitor
22 fire hydrant
23 water spray facility
31 curb
32 catch basin
33 surface water drainage facility
4 color poles

What is claimed is:

1. A treatment plant for handling a flammable fluid, the treatment plant comprising:

an equipment placement region in which a plurality of equipments configured to handle the flammable fluid are placed, the equipment placement region being divided into four or more firewater supply sections so that the four or more firewater supply sections include the equipments, respectively; and a plurality of fire-extinguishing water supply facilities provided to the four or more firewater supply sections, respectively, the fire-extinguishing water supply facilities each being capable of, when a fire occurs in one of the equipments placed in the four or more firewater supply sections, simultaneously supplying fire-extinguishing water to a fire-occurrence section corresponding to a firewater supply section among the four or more firewater supply sections in which the fire has occurred and an adjacent section being a firewater supply section among the four or more firewater supply sections that is less than a preset safety clearance distance away from the fire-occurrence section, wherein the preset safety clearance distance prevents the spread of fire across the preset safety clearance distance, wherein, the four or more firewater supply sections are defined so that a distance from the fire-occurrence section to a second firewater supply section next to the adjacent section always becomes equal to or larger than the preset safety clearance distance when any of the four or more firewater supply sections becomes the fire-occurrence section, wherein the treatment plant is a plant, that handles the flammable fluid or performs a treatment using the flammable fluid.

2. The treatment plant according to claim 1, wherein the safety clearance distance is set to fall within a range of from 3 meters to 50 meters.

3. The treatment plant according to claim 1, wherein, when a pipe rack being a frame configured to hold a plurality of pipes through which a fluid to be sent and received between the plurality of equipments is placed in the equipment placement region, the safety clearance distance is regarded as being ensured between two firewater supply sections among the four or more firewater supply sections that are located facing each other across the pipe rack.

4. The treatment plant according to claim 1, wherein a capacity to supply fire-extinguishing water to the plurality of fire-extinguishing water supply facilities is determined based on a maximum value of a result of calculation of a firewater supply amount supplied to the fire-occurrence section and the adjacent section, which is obtained for each of the firewater supply sections.

5. The treatment plant according to claim 4, wherein a water drainage capacity of the treatment plant is determined based on the maximum value of the firewater supply amount.

6. The treatment plant according to claim 5, wherein, when an estimated water drainage amount in view of precipitation on a site of the treatment plant is larger than the maximum value of the firewater supply amount, the water drainage capacity of the treatment plant is determined based on the estimated water drainage amount.

7. The treatment plant according to claim 1, wherein the fire-extinguishing water supply facilities are selected from a firewater supply facility group including a fire hydrant, a fire monitor, a water spray facility, and a foam fire-extinguishing facility.

8. The treatment plant according to claim 1, wherein, when an auxiliary facility selected from an auxiliary facility group including a plurality of firewater supply heads for a water spray facility configured to supply fire-extinguishing water, a plurality of foam heads for a foam fire-extinguishing facility configured to supply foam-like fire-extinguishing water, a curb configured to prevent a liquid having flowed out onto a ground from flowing to an outside, a catch basin configured to discharge a liquid flowing on the ground, and a surface water drainage facility configured to guide a liquid flowing on the ground to a drain ditch by inclination of the ground is provided in a machine placement region divided into the four or more firewater supply sections, the auxiliary facility is provided in one of the firewater supply sections, each serving as an installation unit, without being located in a plurality of firewater supply sections or lying over a border of a plurality of firewater supply sections.

9. A method of designing a treatment plant for handling a flammable fluid, the method comprising:

a step of determining positions at which a plurality of equipments configured to handle the flammable fluid are arranged for an equipment placement region of a site of the treatment plant;

a step of dividing the equipment placement region into four or more firewater supply sections so that the firewater supply sections include the equipments, respectively; and a step of determining, for each of the firewater supply sections, installation of a plurality of fire-extinguishing water supply facilities having a capacity to, when a fire occurs in one of the equipments placed in the firewater supply sections, simultaneously supply fire-extinguishing water to a fire-occurrence section corresponding to a firewater supply section among the four or more firewater supply sections in which the fire has occurred and an adjacent section being a firewater supply section among the four or more firewater supply sections that is less than a preset safety clearance distance away from the fire-occurrence section, wherein the preset safety clearance distance prevents the spread of fire across the preset safety clearance distance, wherein, in the step of dividing the equipment placement region, the equipment placement region is divided so that a distance from the fire-occurrence section to a second firewater supply section next to the adjacent section always becomes equal to or larger than the preset safety clearance distance when any of the four or more firewater supply sections becomes the fire-occurrence section, wherein the treatment plant is a plant, that handles the flammable fluid or performs a treatment using the flammable fluid.

10. The method of designing a treatment plant according to claim 9, wherein the safety clearance distance is set to fall within a range of from 3 meters to 50 meters.

11. The method of designing a treatment plant according to claim 9, wherein the step of determining positions at which the equipments are arranged includes determination of a position at which a pipe rack being a frame configured to hold a plurality of pipes through which a fluid to be sent and received between the plurality of equipments is placed in the equipment placement region is arranged, and wherein the safety clearance distance is regarded as being ensured between two firewater supply sections among the four or more firewater supply sections that are located facing each other across the pipe rack.

12. The method of designing a treatment plant according to claim 9, further comprising a step of calculating a firewater supply amount to be supplied to the fire-occurrence section and the adjacent section for each of the firewater supply sections and determining a capacity to supply fire-extinguishing water to the plurality of fire-extinguishing water supply facilities based on a maximum value of the firewater supply amount.

13. The method of designing a treatment plant according to claim 12, further comprising a step of determining a water drainage capacity of the treatment plant based on the maximum value of the firewater supply amount.

14. The method of designing a treatment plant according to claim 13, wherein, when an estimated water drainage amount in view of precipitation on a site of the treatment plant is larger than the maximum value of the firewater supply amount, the water drainage capacity of the treatment plant is determined based on the estimated water drainage amount in the step of determining the water drainage capacity of the treatment plant.

15. The method of designing a treatment plant according to claim 9, wherein the fire-extinguishing water supply facilities are selected from a firewater supply facility group including a fire hydrant, a fire monitor, a water spray facility, and a foam fire-extinguishing facility.

16. The method of designing a treatment plant according to claim 9, further comprising a step of determining installation of an auxiliary facility selected from an auxiliary facility group including a plurality of firewater supply heads for a water spray facility configured to supply fire-extinguishing water, a plurality of foam heads for a foam fire-extinguishing facility configured to supply foam-like fire-extinguishing water, a curb configured to prevent a liquid having flowed out onto a ground from flowing to an outside, a catch basin configured to discharge a liquid flowing on the ground, and a surface water drainage facility configured to guide a liquid flowing on the ground to a drain ditch by inclination of the ground, wherein the installation of the auxiliary facility is determined so that the auxiliary facility is provided in one of the firewater supply sections, each serving as an installation unit, without being located in a plurality of firewater supply sections or lying over a border of a plurality of firewater supply sections.

17. The treatment plant according to claim 1, wherein the treatment plant is at least one of a natural gas plant, a petroleum refining plant, a chemical plant, or a nuclear power plant.

18. The treatment plant according to claim 9, wherein the treatment plant is at least one of a natural gas plant, a petroleum refining plant, a chemical plant, or a nuclear power plant.

* * * * *